US010909001B1

(12) United States Patent
Kucherov et al.

(10) Patent No.: US 10,909,001 B1
(45) Date of Patent: Feb. 2, 2021

(54) STORAGE SYSTEM WITH SNAPSHOT GROUP SPLIT FUNCTIONALITY

(71) Applicant: EMC IP Holding Company LLC, Hopkinton, MA (US)

(72) Inventors: Anton Kucherov, Dudley, MA (US); David Meiri, Somerville, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 24 days.

(21) Appl. No.: 16/549,533

(22) Filed: Aug. 23, 2019

(51) Int. Cl.
*G06F 12/00* (2006.01)
*G06F 11/14* (2006.01)
*G06F 3/06* (2006.01)

(52) U.S. Cl.
CPC .......... *G06F 11/1458* (2013.01); *G06F 3/065* (2013.01); *G06F 3/0614* (2013.01); *G06F 3/0644* (2013.01); *G06F 3/0659* (2013.01); *G06F 3/0673* (2013.01); *G06F 11/1451* (2013.01); *G06F 2201/84* (2013.01)

(58) Field of Classification Search
CPC .. G06F 11/1458; G06F 3/0614; G06F 3/0644; G06F 3/065; G06F 3/0659; G06F 3/0673; G06F 11/1451; G06F 2201/84
See application file for complete search history.

(56) References Cited

U.S. PATENT DOCUMENTS

| | | | |
|---|---|---|---|
| 7,444,464 B2 | 10/2008 | Urmston et al. | |
| 8,095,726 B1 | 1/2012 | O'Connell et al. | |
| 8,214,612 B1 | 7/2012 | Natanzon | |
| 9,104,326 B2 | 8/2015 | Frank et al. | |
| 9,208,162 B1 | 12/2015 | Hallak et al. | |
| 9,286,003 B1 | 3/2016 | Hallak et al. | |
| 9,552,258 B2 | 1/2017 | Hallak et al. | |

(Continued)

FOREIGN PATENT DOCUMENTS

WO 2016111954 A1 7/2016

OTHER PUBLICATIONS

EMC Corporation, "Introduction to the EMC XtremIO Storage Array (Ver. 4.0): A Detailed Review," White Paper, Apr. 2015, 65 pages.
EMC Corporation, "Unstoppable Data Reduction: Always-on, In-Line, Zero-Penalty, Enterprise-Class, Free," https://store.emc.com/xtremio, Jul. 2014, 2 pages.
EMC Corporation, "Introduction to XtremIO Virtual Copies," White Paper, Mar. 2016, 39 pages.

(Continued)

*Primary Examiner* — John A Lane
(74) *Attorney, Agent, or Firm* — Ryan, Mason & Lewis, LLP

(57) ABSTRACT

A processing device identifies a first snapshot to be split from a first snapshot group, generates a second snapshot of the first snapshot, continues write operations to the first snapshot, copies the second snapshot to a storage volume of a second snapshot group, and computes a differential between the first and second snapshots. Responsive to the differential between the first and second snapshots being above a specified threshold, an additional snapshot of the first snapshot is generated, a differential is computed between the additional snapshot and a previous snapshot of the first snapshot, and if necessary the generating of an additional snapshot and the computing of a differential are repeated one or more additional times, until the differential is at or below the specified threshold. The processing device updates the storage volume based at least in part on one or more of the computed differentials.

20 Claims, 7 Drawing Sheets

(56) References Cited

U.S. PATENT DOCUMENTS

| | | | |
|---|---|---|---|
| 9,606,870 B1 | 3/2017 | Meiri et al. | |
| 9,716,754 B2 | 7/2017 | Swift | |
| 10,083,093 B1* | 9/2018 | Natanzon | G06F 11/1458 |
| 10,176,046 B1 | 1/2019 | Hu et al. | |
| 10,185,505 B1* | 1/2019 | Golden | G06F 3/0665 |
| 10,191,674 B2* | 1/2019 | Purohit | G06F 3/0659 |
| 10,191,677 B1* | 1/2019 | Natanzon | G06F 11/2023 |
| 10,261,693 B1 | 4/2019 | Schneider et al. | |
| 10,324,640 B1 | 6/2019 | Chen et al. | |
| 10,338,851 B1 | 7/2019 | Kronrod et al. | |
| 10,437,508 B1* | 10/2019 | Medan | G06F 3/0619 |
| 10,776,317 B1* | 9/2020 | Veeraswamy | G06F 3/0604 |
| 2008/0279462 A1 | 11/2008 | Celi, Jr. | |
| 2009/0132955 A1 | 5/2009 | Garg et al. | |
| 2010/0179941 A1 | 7/2010 | Agrawal et al. | |
| 2013/0325824 A1 | 12/2013 | Shoens | |
| 2014/0181016 A1 | 6/2014 | Whitehead et al. | |
| 2014/0195754 A1* | 7/2014 | Colgrove | G06F 3/0667 711/162 |
| 2016/0150012 A1 | 5/2016 | Barszczak et al. | |
| 2016/0170987 A1 | 6/2016 | Kesselman | |
| 2016/0202927 A1 | 7/2016 | Klarakis et al. | |
| 2016/0224259 A1 | 8/2016 | Ahrens et al. | |
| 2017/0185323 A1* | 6/2017 | Kaushik | G06F 11/1469 |
| 2017/0192857 A1 | 7/2017 | Meiri et al. | |
| 2017/0242599 A1* | 8/2017 | Patnaik | G06F 3/067 |
| 2017/0249222 A1* | 8/2017 | Patnaik | G06F 11/1446 |
| 2017/0308305 A1* | 10/2017 | Goel | G06F 3/0641 |

OTHER PUBLICATIONS

EMC Corporation, "XtremIO Data Production (XDP): Flash-Specific Data Protection, Provided by XtremIO (Ver. 4.0)," White Paper, Apr. 2015, 25 pages.

Dell EMC, "XtremIO v6.0 Specifications," Specification Sheet, 2017, 4 pages.

Dell EMC, "Dell EMC XtremIO X2: Next-Generation All-Flash Array," Data Sheet, 2017, 5 pages.

EMC Corporation, "High Availability, Data Protection and Data Integrity in the XtremIO Architecture," White Paper, Apr. 2015, 28 pages.

Dell EMC, "Introduction to Dell EMC XtremIO X2 Storage Array—a Detailed Review," Dell EMC White Paper, Aug. 2017, 46 pages.

N. Tolia et al., "Opportunistic Use of Content Addressable Storage for Distributed File Systems," Proceedings of the USENIX Annual Technical Conference, Jun. 9-14, 2003, 14 pages.

EMC Corporation, "EMC Recoverpoint Replication of XtremIO: Understanding the Essentials of RecoverPoint Snap-Based Replication for XtremIO," EMC White Paper, Aug. 2015, 31 pages.

Dell EMC, "Introduction to Dell EMC XtremIO X2 Storage Array—a Detailed Review," Dell EMC White Paper, Apr. 2018, 52 pages.

Dell EMC, "Introduction to XtremIO Metadata-Aware Replication," Dell EMC White Paper, Apr. 2018, 18 pages.

U.S. Appl. No. 16/516,539 filed in the name of Anton Kucherov et al. on Jul. 19, 2019 and entitled "Storage System with Snapshot Group Merge Functionality."

* cited by examiner

STORAGE SYSTEM WITH SNAPSHOT GROUP SPLIT FUNCTIONALITY

FIELD

The field relates generally to information processing systems, and more particularly to storage in information processing systems.

BACKGROUND

It is common for a storage system to maintain multiple snapshots for each of multiple storage volumes of the storage system. Each such snapshot illustratively represents a particular point-in-time (PIT) copy of its corresponding storage volume. Groups of related storage volume snapshots, also referred to herein as snapshot groups or "snapgroups," each illustratively capturing changes to a particular corresponding storage volume over time, are also commonly maintained by the storage system. However, there may be instances in which it is no longer beneficial to maintain a particular snapshot within a given snapshot group. For example, the data content of the particular snapshot may have deviated significantly from that of its corresponding storage volume. In these and other situations, it would be desirable to split the particular snapshot away from the snapshot group. Conventional approaches are unable to perform such splitting for an active snapshot, that is, one that is being written to by one or more host devices, while also maintaining the desired consistency.

SUMMARY

Illustrative embodiments provide storage systems that are configured to implement snapshot group split functionality. For example, in some embodiments, techniques are provided for splitting a snapshot from a snapgroup in a manner that advantageously ensures consistency in the case of an active snapshot. Such embodiments can therefore be configured to accurately and effectively split an actively written snapshot from one snapshot group into a separate storage volume of another snapshot group, while maintaining the consistency of the actively written snapshot and the separate storage volume. Numerous other split scenarios are possibly using the disclosed techniques.

These embodiments illustratively include a clustered implementation of a content addressable storage system having a distributed storage controller. Similar advantages can be provided in other types of storage systems.

In one embodiment, an apparatus includes at least one processing device comprising a processor coupled to a memory, with the processing device being configured to identify a first snapshot to be split from a first snapshot group, to generate a second snapshot of the first snapshot, to continue write operations to the first snapshot, to copy the second snapshot to a storage volume of a second snapshot group, and to compute a differential between the first and second snapshots. Responsive to the differential between the first and second snapshots being above a specified threshold, the processing device generates an additional snapshot of the first snapshot, computes a differential between the additional snapshot and a previous snapshot of the first snapshot, and if necessary repeats the generating of an additional snapshot and the computing of a differential between the additional snapshot and a previous snapshot one or more additional times, until the differential is at or below the specified threshold. The processing device updates the storage volume of the second snapshot group based at least in part on one or more of the computed differentials.

In some embodiments, the storage system comprises a plurality of storage nodes, with each of the storage nodes comprising a set of processing modules configured to communicate with corresponding sets of processing modules on other ones of the storage nodes. The sets of processing modules of the storage nodes of the storage system collectively comprise at least a portion of the storage controller of the storage system. Each of the sets of processing modules illustratively comprises one or more control modules, one or more routing modules and one or more data modules, and at least one of the sets of processing modules comprises a management module. Numerous other clustered and non-clustered storage system arrangements are possible in other embodiments.

These and other illustrative embodiments include, without limitation, apparatus, systems, methods and processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
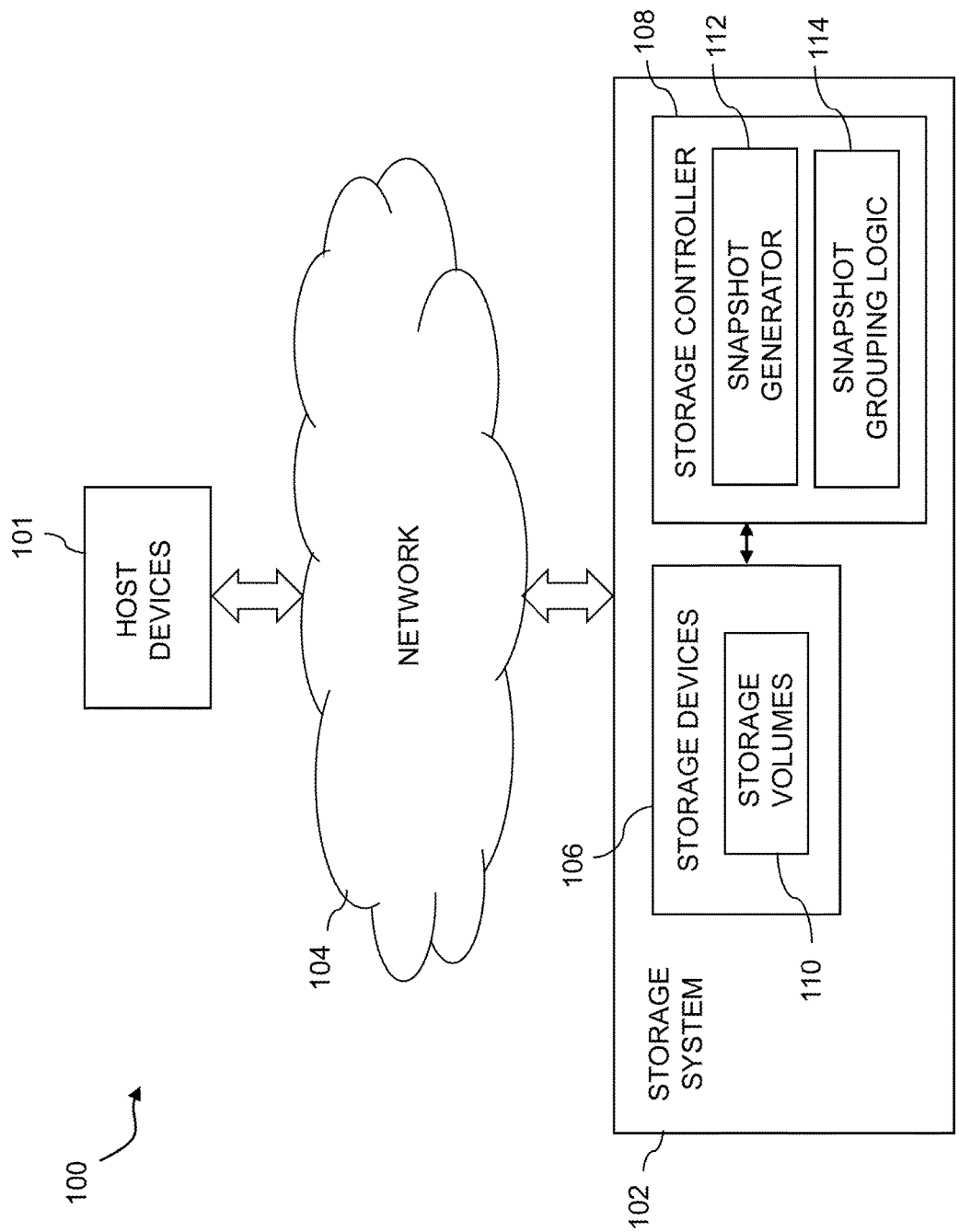
FIG. 1 is a block diagram of an information processing system comprising a storage system having snapgroup split functionality in an illustrative embodiment.

FIG. 1 shows an information processing system 100 configured in accordance with an illustrative embodiment. The information processing system 100 comprises a plurality of host devices 101 and a storage system 102, which are configured to communicate with one another over a network 104. The storage system 102 is more particularly configured in this embodiment to implement snapshot group split functionality for storage volumes. For example, the storage system 102 is illustratively configured to split an actively written snapshot from one snapshot group into a storage volume of another snapshot group in a manner that ensures consistency. Numerous other split arrangements are possible using the techniques disclosed herein. Such snapshot group split functionality in some embodiments can also involve one or more of the host devices 101.

The host devices 101 illustratively comprise servers or other types of computers of an enterprise computer system, cloud-based computer system or other arrangement of multiple compute nodes associated with respective users.

The host devices 101 in some embodiments illustratively provide compute services such as execution of one or more applications on behalf of each of one or more users associated with respective ones of the host devices. Such applications illustratively generate input-output (TO) operations that are processed by the storage system 102. The term "input-output" as used herein refers to at least one of input and output. For example, TO operations generated by applications executing on the host devices 101 may comprise write requests and/or read requests directed to stored data of the storage system 102. These and other types of TO operations are also generally referred to herein as TO requests.

The storage system 102 illustratively comprises one or more processing devices of at least one processing platform. For example, the storage system 102 can comprise one or more processing devices each having a processor and a memory, possibly implementing virtual machines and/or containers, although numerous other configurations are possible.

The storage system 102 can additionally or alternatively be part of cloud infrastructure such as an Amazon Web Services (AWS) system. Other examples of cloud-based systems that can be used to provide at least portions of the storage system 102 include Google Cloud Platform (GCP) and Microsoft Azure.

The host devices 101 and the storage system 102 may be implemented on a common processing platform, or on separate processing platforms.

The host devices 101 are illustratively configured to write data to and read data from the storage system 102 in accordance with applications executing on those host devices for system users.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The storage system 102 comprises a plurality of storage devices 106 and an associated storage controller 108. The storage devices 106 store storage volumes 110. The storage volumes 110 illustratively comprise respective logical units (LUNs) or other types of logical storage volumes.

The storage devices 106 of the storage system 102 illustratively comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices may also be used. For example, hard disk drives (HDDs) can be used in combination with or in place of SSDs or other types of NVM devices.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises hard disk drives. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices.

In some embodiments, the storage system 102 illustratively comprises a scale-out all-flash content addressable storage array such as an XtremIO™ storage array from Dell EMC of Hopkinton, Mass. Other types of storage arrays, including by way of example VNX® and Symmetrix VMAX® storage arrays also from Dell EMC, can be used to implement storage system 102 in other embodiments.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage system 102 in illustrative embodiments include all-flash and hybrid flash storage arrays such as Unity™ software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

In some embodiments, communications between the host devices 101 and the storage system 102 comprise Small Computer System Interface (SCSI) commands. Other types of SCSI or non-SCSI commands may be used in other embodiments, including commands that are part of a standard command set, or custom commands such as a "vendor unique command" or VU command that is not part of a standard command set. The term "command" as used herein is therefore intended to be broadly construed, so as to encompass, for example, a composite command that comprises a combination of multiple individual commands. Numerous other commands can be used in other embodiments.

The storage controller 108 of storage system 102 in the FIG. 1 embodiment includes snapshot generator 112 and snapshot grouping logic 114.

The storage controller 108 may include additional modules and other components typically found in conventional implementations of a storage controller of a storage system, although such additional modules and other components are omitted from the figure for clarity and simplicity of illustration. For example, the storage controller 108 in illustrative embodiments can include a signature generator for generating content-based signatures of respective data pages, and a replication engine for replicating one or more of the storage volumes 110 to another storage system.

The snapshot generator 112 generates snapshots of the storage volumes 110 over time. Each of one or more of the snapshots represents a particular PIT copy of its corresponding storage volume.

The snapshot grouping logic 114 maintains groups of related storage volume snapshots, also referred to herein as snapshot groups or "snapgroups," each illustratively capturing changes to one or more storage volume over time.

In some embodiments, one or more of the snapshots comprise what are referred to herein as "active snapshots." These are snapshots that are actively written in accordance with write operations, just like an ordinary storage volume. The active snapshot is sometimes referred to as a "clone" of the corresponding storage volume from which it is generated, and shares metadata with that storage volume. Although an active snapshot of this type is initially generated as a copy of the corresponding storage volume, the active snapshot can change over time in a manner that causes its data content to deviate from that of the storage volume from which the active snapshot was initially generated. The term "storage volume" as broadly used herein is intended to encompass active snapshots that are generated in the manner described above as respective clones of other storage volumes.

The snapshot grouping logic 114 is also configured to control performance of a snapshot group split process for multiple ones of the storage volumes 110. For example, the snapshot group split process in some embodiments is illustratively configured to split an active snapshot initially generated as a copy of one of the storage volumes in a particular snapshot group into another storage volume of another snapshot group.

A given set of storage volumes designated for participation in the snapshot group split process illustratively comprises a set of LUNs or other instances of the storage volumes 110 of the storage system 102. Each such LUN or other storage volume illustratively comprises at least a portion of a physical storage space of one or more of the storage devices 106. The term "storage volume" as used herein is intended to be broadly construed, and should not be viewed as being limited to any particular format or configuration.

The snapshot groups are illustratively represented by respective snapshot trees in the storage system 102. A given one of the snapshot trees more particularly comprises a root node, at least one branch node, and a plurality of leaf nodes. A first one of the leaf nodes which is a child of a given branch node represents an active storage volume, and a second one of the leaf nodes which is a child of the given branch node comprises the corresponding snapshot providing a PIT copy of the storage volume. Snapshots can also be generated of active snapshots as those active snapshots change over time responsive to write operations.

Figure 2:
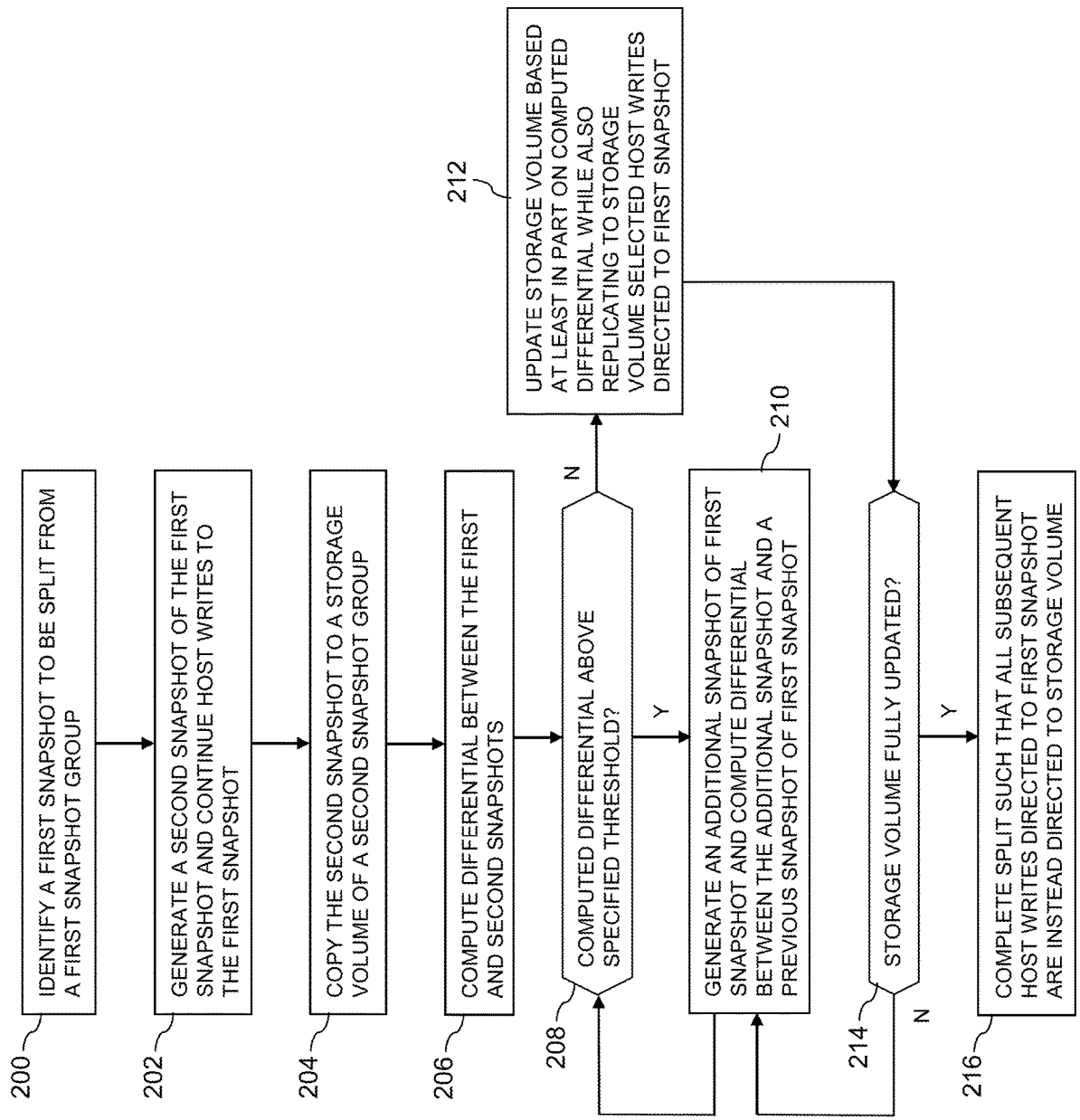
FIG. 2 is a flow diagram of a process for splitting a snapshot from a snapgroup in an illustrative embodiment.

Illustrative examples of snapshot trees of the type described above are shown in FIGS. 3A and 3B, and will be described in greater detail below in conjunction with the flow diagram of FIG. 2. The flow diagram of FIG. 2 shows an example process for splitting an active snapshot from a snapshot group.

In some embodiments, the snapshot trees comprise or are otherwise associated with additional information also arranged in the form of a tree structure. For example, a given one of the snapshot trees may comprise or be otherwise associated with one or more additional trees including at least one of a "dirty" tree that characterizes updates to logical addresses of the corresponding storage volume and/or its active snapshot, and a hash tree comprising content-based signatures of respective ones of the logical addresses of the corresponding storage volume. All nodes of a given snapshot tree in some embodiments, including both branch nodes and leaf nodes, may each be associated with corresponding metadata of both a dirty tree and a hash tree. The term "snapshot tree" as used herein is intended to be broadly construed so as to encompass such dirty trees and hash trees, or other tree-like data structures that incorporate similar information characterizing changes to a storage volume and/or an active snapshot over time.

An instance of a differential scan performed for the given snapshot tree in embodiments of this type can further comprise aggregating information of at least one of the dirty tree and the hash tree between start and stop nodes of the given snapshot tree. The start and stop nodes are examples of what are more generally referred to herein as first and second nodes corresponding to respective current and previous snapshots. Start and stop nodes can comprise branch nodes or leaf nodes associated with those branch nodes. Also, a given one of the first and second nodes can comprise a leaf node rather than a branch node. Terms such as "start node," "stop node," "first node" and "second node" are therefore intended to be broadly construed, and should not be viewed as being restricted to either branch nodes or leaf nodes.

A wide variety of other types of snapshot trees and possibly one or more associated additional trees can be used in other embodiments. Also, the term "tree" as used herein is intended to be broadly construed so as to comprise any type of data structure characterizing a plurality of nodes and a plurality of edges interconnecting respective pairs of the nodes.

Terms such as "snapshot group" and "snapgroup" as used herein are also intended to be broadly construed, so as to encompass, for example, various types and arrangements of sets of related snapshots, possibly including one or more active snapshots.

In accordance with the snapgroup split functionality, the storage controller 108 is configured to identify a first snapshot to be split from a first snapshot group of the storage system 102, to generate a second snapshot of the first snapshot, to continue write operations to the first snapshot, to copy the second snapshot to a storage volume of a second snapshot group of the storage system 102, and to compute a differential between the first and second snapshots. Responsive to the differential between the first and second snapshots being above a specified threshold, the storage controller 108 is further configured to generate an additional snapshot of the first snapshot, to compute a differential between the additional snapshot and a previous snapshot of the first snapshot, and if necessary to repeat the generating of an additional snapshot and the computing of a differential between the additional snapshot and a previous snapshot one or more additional times, until the differential is at or below the specified threshold, and to update the storage volume of the second snapshot group based at least in part on one or more of the computed differentials. Such operations are illustratively performed by or otherwise under the control of the snapshot grouping logic 114 of the storage controller 108.

The specified threshold is illustratively determined based at least in part on an amount of time required to process a computed differential of a particular size, although other types of thresholds can be used in processing differentials computed between pairs of snapshots in other embodiments. For example, the specified threshold can be in terms of a maximum number of different corresponding data pages between the snapshots, illustratively based on comparisons of hash handles or other content-based signatures of the respective data pages. The term "threshold" as used herein is therefore intended to be broadly construed.

The first snapshot group in some embodiments is in the form of a first snapshot tree having a first root node, and the storage volume is part of a second snapshot group in the form of a second snapshot tree having a second root node different than the first root node.

Figure 3A:
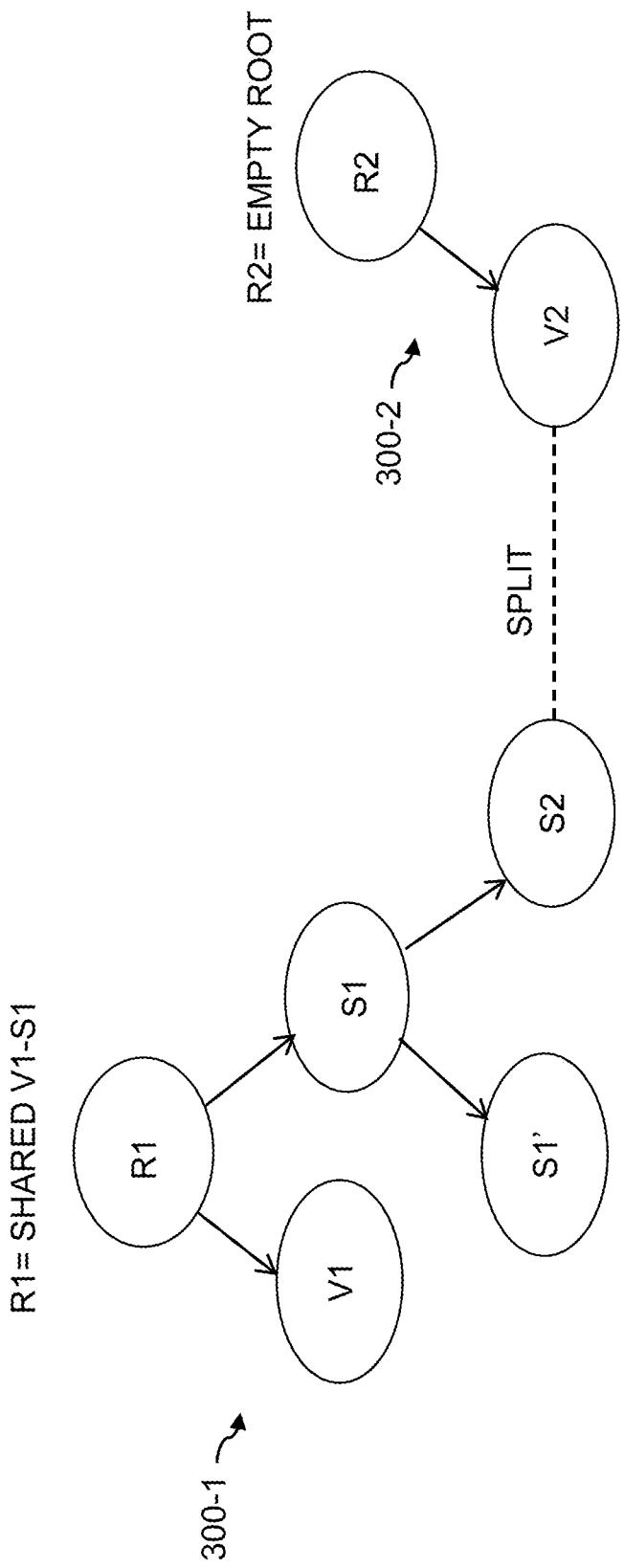
FIGS. 3A and 3B show example snapshot trees utilized in splitting a snapshot from a snapgroup in an illustrative embodiment.
Figure 3B:
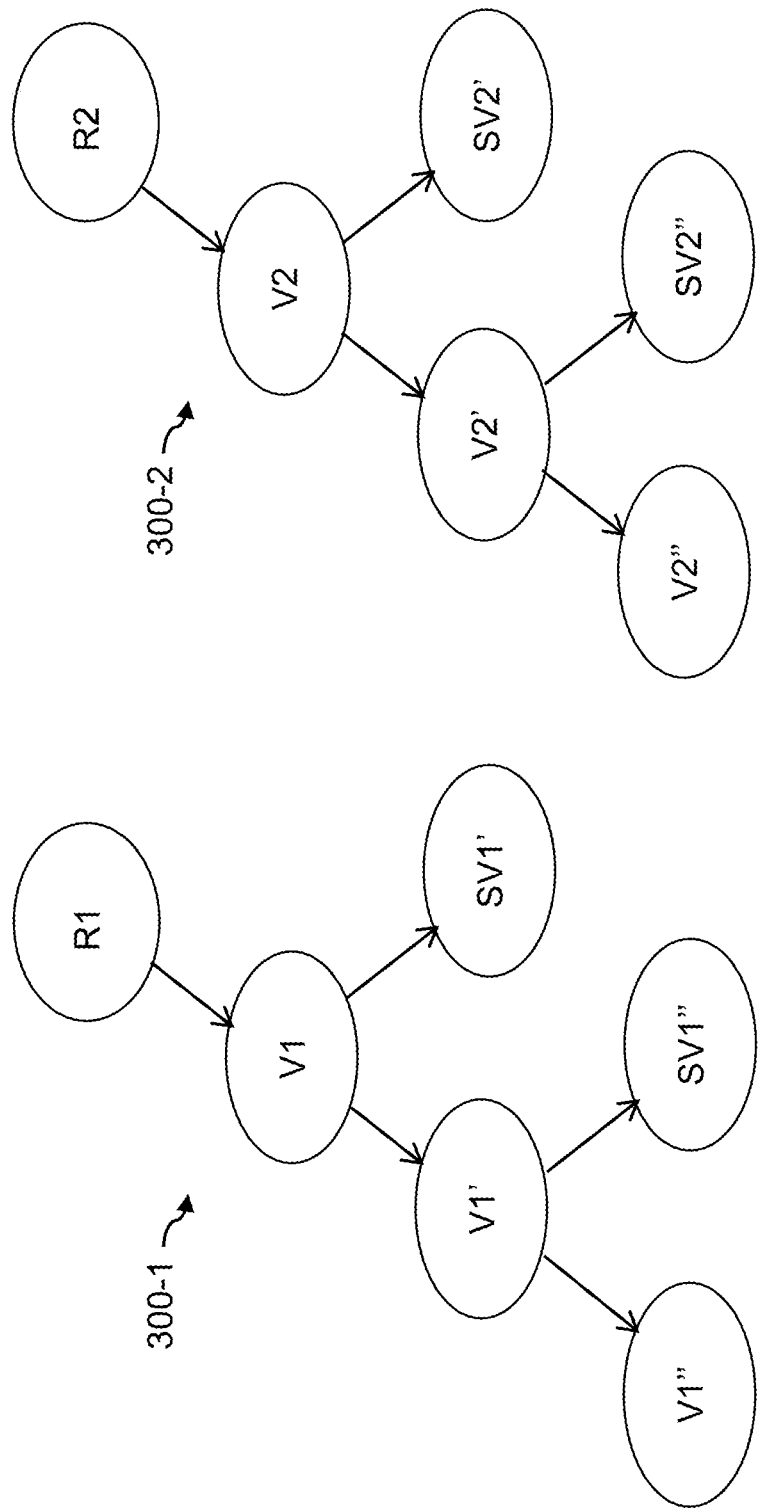

An example of such an arrangement can be seen in FIGS. 3A and 3B, with the first and second root nodes of first and second snapshot trees 300-1 and 300-2 being denoted as R1 and R2, respectively. The first and second snapshots are denoted as S1 and S2, respectively. It is assumed in this embodiment that S1' represents the current active version of the first snapshot S1, and that the second snapshot S2 is a static PIT copy of S1. Storage volumes V1 and V2 are child nodes of the respective root nodes R1 and R2. The storage volume V1 shares its root node R1 with the first snapshot S1, as indicated in FIG. 3A.

In some embodiments, copying the second snapshot to the storage volume of the second snapshot group comprises generating a differential between the second snapshot and an empty root node, and constructing the storage volume of the second snapshot group based at least in part on the differential between the second snapshot and the empty root node.

As mentioned previously, the storage system 102 in some embodiments comprises a content addressable storage system. In such a system, logical addresses of data pages are mapped to physical addresses of the data pages using respective content-based signatures that are generated from those data pages.

The content-based signatures utilized in some embodiments illustratively comprise respective hash digests of respective data pages of a storage volume. A given one of the hash digests is generated in illustrative embodiments by applying a secure hashing algorithm to content of a corresponding one of the data pages of the storage volume. For example, a given hash digest can be generated by application of a hash function such as the well-known Secure Hashing Algorithm 1 (SHA1) to the content of its corresponding data page. Other types of secure hashing algorithms, such as SHA2 or SHA256, or more generally other hash functions, can be used in generating content-based signatures herein.

A given hash digest in illustrative embodiments is unique to the particular content of the data page from which it is generated, such that two data pages with exactly the same content will have the same hash digest, while two data pages with different content will have different hash digests. It is also possible that other types of content-based signatures may be used, such as hash handles of the type described elsewhere herein. A hash handle generally provides a shortened representation of its corresponding hash digest. More particularly, the hash handles are shorter in length than respective hash digests that are generated by applying a secure hashing algorithm to respective ones of the data pages. Hash handles are considered examples of "content-based signatures" as that term is broadly used herein.

In some embodiments, various types of address metadata are utilized to provide content addressable storage functionality in storage system 102. The address metadata in some embodiments comprises at least a portion of one or more logical layer mapping tables that map logical addresses of respective ones of the data pages of a storage volume to corresponding content-based signatures of the respective data pages.

Examples of logical layer mapping tables and other metadata structures maintained by the storage controller 108 of storage system 102 are described below. It is to be appreciated that these particular tables are only examples, and other tables or metadata structures having different configurations of entries and fields can be used in other embodiments.

The logical layer and physical layer mapping tables in some embodiments illustratively include the following:

1. An address-to-hash ("A2H") table. The A2H table comprises a plurality of entries accessible utilizing logical addresses as respective keys, with each such entry of the A2H table comprising a corresponding one of the logical addresses, a corresponding one of the hash handles, and possibly one or more additional fields.

2. A hash-to-data ("H2D") table that illustratively comprises a plurality of entries accessible utilizing hash handles as respective keys, with each such entry of the H2D table comprising a corresponding one of the hash handles, a physical offset of a corresponding one of the data pages, and possibly one or more additional fields.

3. A hash metadata ("HMD") table illustratively comprising a plurality of entries accessible utilizing hash handles as respective keys. Each such entry of the HMD table comprises a corresponding one of the hash handles, a corresponding reference count and a corresponding physical offset of one of the data pages. A given one of the reference counts denotes the number of logical pages in the storage system that have the same content as the corresponding data page and therefore point to that same data page via their common hash digest. The HMD table illustratively comprises at least a portion of the same information that is found in the H2D table. Accordingly, in other embodiments, those two tables can be combined into a single table, illustratively referred to as an H2D table, an HMD table or another type of physical layer mapping table providing a mapping between hash values, such as hash handles or hash digests, and corresponding physical addresses of data pages.

4. A physical layer based ("PLB") table that illustratively comprises a plurality of entries accessible utilizing physical offsets as respective keys, with each such entry of the PLB table comprising a corresponding one of the physical offsets, a corresponding one of the hash digests, and possibly one or more additional fields.

As indicated above, the hash handles are generally shorter in length than the corresponding hash digests of the respective data pages, and each illustratively provides a short representation of the corresponding full hash digest. For example, in some embodiments, the full hash digests are 20 bytes in length, and their respective corresponding hash handles are illustratively only 4 or 6 bytes in length.

Again, the logical layer and physical layer mapping tables referred to above are examples only, and can be varied in other embodiments.

In an embodiment in which storage system 102 comprises a content based storage system, computing a given one of the differentials illustratively comprises computing the given differential based in part on a comparison of content-based signatures of respective data pages between the corresponding snapshots, where the content-based signatures comprise hash handles of the respective data pages and/or hash digests of the respective data pages.

The storage controller 108 can identify a particular active snapshot to be split from the first snapshot group responsive to a determination that the particular active snapshot has deviated significantly from the corresponding storage volume from which it was initially generated. For example, the particular active snapshot may no longer share significant amounts of matching data with its corresponding storage volume.

The term "matching data" as used herein is intended to be broadly construed, and is illustratively determined in some embodiments using hash handles, hash digests or other types of content-based signatures of respective data pages. For example, a match between hash handles of respective data pages at a given logical address in the active snapshot and its corresponding storage volume can be used as an indication that the two data pages comprise "matching data" relative to one another. Other indications of matching data between an active snapshot and a corresponding storage volume can be used in other embodiments.

The amount of matching data can be determined as a number of data pages of the active snapshot having content-based signatures that match content-based signatures of the corresponding data pages of the storage volume.

Such a determination can be based on sampling of data pages of the active snapshot and comparing the sampled data pages to the corresponding pages of the storage volume. For example, comparing a portion of an active snapshot to a corresponding portion of a storage volume to determine amounts of matching data illustratively comprises performing a multiple levels of comparisons, with a first level comparison using a relatively small sample of data pages, followed by a second level comparison using a relatively large sample of data pages. Such comparisons illustratively use hash handles, hash digests or other content-based signatures of respective ones of the data pages.

Identification arrangements of the type described above can be used to allow storage administrators and other system users to estimate the benefits that can be achieved by splitting an active snapshot from a snapgroup. Illustrative embodiments therefore include estimation tools that are deployed within or in conjunction with the storage system 102 in order to periodically or under other conditions generate such estimates.

In some embodiments, updating the storage volume of the second snapshot group based at least in part on one or more of the computed differentials comprises updating the storage volume of the second snapshot group in respective ones of a plurality of iterations using respective different ones of the computed differentials.

Additionally or alternatively, updating the storage volume of the second snapshot group based at least in part on one or more of the computed differentials illustratively comprises updating the storage volume of the second snapshot group using a particular one of the computed differentials, maintaining a pivot address indicator denoting a particular logical address of the first snapshot to which the updating has progressed, and replicating to the storage volume each of one or more additional received write operations directed to logical addresses of the first snapshot that are previous to the particular logical address denoted by a corresponding current value of the pivot address indicator.

The storage controller 108 in such an embodiment is further configured, responsive to the pivot address indicator reaching a final logical address of the first snapshot, to complete the split of the first snapshot from the first snapshot group into the storage volume of the second snapshot group such that all subsequent writes directed to the first snapshot are instead sent to the storage volume.

The storage controller 108 can delete the first snapshot, the second snapshot and any additional snapshots of the first snapshot from the first snapshot group, responsive to completion of the split of the first snapshot from the first snapshot group into the storage volume of the second snapshot group.

As indicated previously herein, in situations in which the data content of an active snapshot has deviated significantly from that of its corresponding storage volume, it may no longer be beneficial to maintain that active snapshot within the same snapshot group as the storage volume. In these and other situations, illustrative embodiments are configured to split the particular active snapshot away from the snapshot group, while also maintaining the desired consistency for the active snapshot and the storage volume.

In some embodiments, an example snapshot group split process more particularly operates as follows. Assume that the identification process described above has identified a particular active snapshot S1 that should be split from the snapshot group of its corresponding storage volume V1. The example snapshot group split process in this embodiment illustratively includes the following steps:

1. Generate a second snapshot S2 of the active snapshot S1 and continue host writes to the active snapshot S1.

2. Perform a differential scan ("snapdiff") to an empty root node R2 to copy snapshot S2 to a new storage volume V2.

3. Compute a differential between the snapshots S1 and S2. The differential is illustratively computed using a differential scan process.

4. If the computed differential is above a specified threshold, generate an additional snapshot of the active snapshot S1 and compute a differential between the additional snapshot and a previous snapshot of the active snapshot S1. The new storage volume V2 is updated using the computed differential.

5. Repeat steps 3 and 4 until the computed differential is no longer above the threshold. The threshold in this embodiment is illustratively set to ensure that the computed differential is "reasonable" in that it does not indicate an excessive amount of change in data content between consecutive snapshots of the active snapshot S1.

6. Continue to update the new storage volume V2 based on the computed differentials while also forwarding host writes of S1 to V2. Maintain a pivot address indicator to keep track of the progress of the updating of V2. For example, the pivot address indicator illustratively denotes a particular logical address that has been reached in the updating. If a received host write of S1 is directed to a logical address prior to the pivot address indicator, that host write is also forwarded to V2.

7. The updating of V2 is completed responsive to the pivot address indicator reaching the final logical address of S1. At this point, V2 takes on the SCSI parameters or "SCSI personality" of S1, such that all IO operations directed to S1 are instead sent to V2. S1, S2 and any additional snapshots of S1 are deleted.

The above example process efficiently splits the active snapshot S1 of one snapshot group into the storage volume V2 of another snapshot group while ensuring the consistency of S1 and V2 during the split process.

Additional or alternative steps may be used in the snapshot group split process in other embodiments. Also, the ordering of the steps can be varied, and two or more of the steps can be performed at least in part in parallel with each other. Other examples are described below in conjunction with the flow diagram of FIG. 2.

The above-described operations carried out in conjunction with a process for splitting an active snapshot from one snapgroup of the storage system 102 into a storage volume of another snapgroup are illustratively performed at least in part by or otherwise under the control of snapshot grouping logic 114 of the storage controller 108.

The storage system 102 in the FIG. 1 embodiment is assumed to be implemented using at least one processing platform each comprising one or more processing devices each having a processor coupled to a memory. Such processing devices can illustratively include particular arrangements of compute, storage and network resources.

At least portions of the associated host devices 101 may be implemented on the same processing platform as the storage system 102 or on separate processing platforms.

The term "processing platform" as used herein is intended to be broadly construed so as to encompass, by way of illustration and without limitation, multiple sets of processing devices that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host devices 101 and the storage system 102 to reside in different data centers. Numerous other distributed implementations of the host devices 101 and the storage system 102 are possible.

Additional examples of processing platforms utilized to implement storage systems and possibly their associated host devices in illustrative embodiments will be described in more detail below in conjunction with FIGS. 5 and 6.

It is to be appreciated that these and other features of illustrative embodiments are presented by way of example only, and should not be construed as limiting in any way.

Accordingly, different numbers, types and arrangements of system components such as host devices 101, storage system 102, network 104, storage devices 106, storage controller 108 and storage volumes 110 can be used in other embodiments.

For example, the storage system 102 can be configured as a clustered storage system comprising a plurality of storage nodes each comprising a set of processing modules configured to communicate with corresponding sets of processing modules on other ones of the storage nodes. The sets of processing modules of the storage nodes of the storage system 102 in an embodiment of this type collectively comprise at least a portion of the storage controller 108 of the storage system 102.

It should therefore be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, in other embodiments, snapshot group split functionality as disclosed herein can be implemented in one or more host devices, or partially in a host device and partially in a storage system. Accordingly, illustrative embodiments are not limited to arrangements in which all such functionality is implemented in a storage system or a host device, and therefore encompass various hybrid arrangements in which the functionality is distributed over one or more storage systems and one or more associated host devices, each comprising one or more processing devices.

The operation of the information processing system 100 will now be described in further detail with reference to the flow diagram of the illustrative embodiment of FIG. 2, which implements a process for splitting an active snapshot from a snapgroup. The process is suitable for use in system 100 but is more generally applicable to a wide variety of other types of information processing systems comprising one or more host devices and at least one storage system. In describing this flow diagram, reference will also be made to the example snapshot trees of FIGS. 3A and 3B.

The FIG. 2 process as shown includes steps 200 through step 216.

In step 200, a snapshot to be split from a snapshot group is identified. The snapshot to be split is assumed to be an active snapshot and is also referred to as a first snapshot. The snapshot group is referred to as a first snapshot group. The first snapshot was initially generated as a copy of a particular one of the storage volumes 110 of the storage system 102, but then deviates from that storage volume as the data content of the active snapshot changes over time responsive to execution of write operations.

By way of example, the first snapshot in the FIG. 3A embodiment is denoted as snapshot S1. Storage volume V1 denotes the storage volume from which the snapshot S1 was generated. The snapshot S1 and the storage volume V1 are part of a first snapshot group represented by a first snapshot tree 300-1.

Identification of the particular active snapshot to be split from a snapshot group can be performed in a manner described elsewhere herein, such as by a determination that data content of an active snapshot has deviated significantly from that of its corresponding storage volume. In such a situation, the active snapshot and its corresponding storage volume may share only a limited amount of data, leading to excessive snapshot tree overhead that can undermine system performance. Additional or alternative criteria can be used, such as a determination that a size of the snapshot group has exceeded a desired maximum snapshot group size, or a determination that one or more snapshots have been corrupted.

In step 202, a second snapshot of the first snapshot is generated and host writes to the first snapshot are continued, as the first snapshot is an active snapshot. Such host writes are also referred to herein as write operations or write requests.

In step 204, the second snapshot is copied to a storage volume of a second snapshot group. With reference again to the example of FIG. 3A, the second snapshot S2 of the first snapshot group represented by the first snapshot tree 300-1 is copied to a storage volume V2 of a second snapshot group represented by a second snapshot tree 300-2.

In step 206, a differential is computed between the first and second snapshots, illustratively by performing a "snap-diff" operation of the type described elsewhere herein, or another type of differential scanning operation. A given such differential scanning operation identifies differences in data content between the two snapshots, possibly based on comparison of hash handles, hash digests or other types of content-based signatures. For example, the computed differential can identify the number of data page differences between the two snapshots, where a given such data page difference is indicated by a data page at a logical address in the first snapshot having different content than the data page at the same logical address in the second snapshot, again based on their respective hash handles or other content-based signatures. The computed differential in some embodiments can include a total number of such data page differences between the first and second snapshots.

In step 208, a determination is made as to whether or not the computed differential is above a specified threshold. For example, as indicated above, the computed differential can indicate a total number of instances in which a data page at a particular logical address in one of the snapshots has different content that a corresponding data page at the same logical address in the other one of the snapshots. If the computed differential is above the threshold, the process moves to step 210, and otherwise moves to step 212 as indicated.

In step 210, an additional snapshot of the first snapshot is generated, and a differential is computed between the additional snapshot and a previous snapshot of the first snapshot. For example, in a first iteration of step 210, the additional snapshot is illustratively a third snapshot, and the previous snapshot is the second snapshot. In subsequent iterations of step 210, if any, the additional and previous snapshots can be more generally denoted as snapshot SN and snapshot SN-1 respectively.

In step 212, the storage volume is updated based at least in part on one or more computed differentials while also replicating to the storage volume selected host writes that were directed to the first snapshot. This illustratively involves copying at least portions of one or more of the snapshots of the first snapshot to the storage volume, in accordance with the one or more respective differentials. The process then moves to step 214 as indicated.

In step 214, a determination is made as to whether or not the storage volume is fully updated. If the storage volume is not fully updated, the process returns to step 210, and otherwise moves to step 216 as indicated.

In step 216, which is reached after it is determined that the storage volume is fully updated, the split is completed such as that all subsequent host writes directed to the first snapshot are instead directed to the storage volume. With reference again to the example of FIG. 3A, storage volume V2 at this point is fully updated, and so the first and second snapshots S1 and S2, and any additional snapshots generated in the manner described above, can be deleted from the first snapshot tree 300-1. A post-split view of the two snapshot trees 300-1 and 300-2 after such deletion is shown in FIG. 3B.

The particular processing operations and other system functionality described in conjunction with the flow diagram of FIG. 2 are presented by way of illustrative example only, and should not be construed as limiting the scope of the disclosure in any way. Alternative embodiments can use other types of processing operations for implementing snapshot group split functionality. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different snapshot group split processes to split respective different active snapshots from their respective snapshot groups or for different storage systems or portions thereof within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, storage controllers such as storage controller 108 of storage system 102 that are configured to control performance of one or more steps of the snapshot group split process of FIG. 2 can be implemented as part of what is more generally referred to herein as a processing platform comprising one or more processing devices each comprising a processor coupled to a memory. A given such processing device may correspond to one or more virtual machines or other types of virtualization infrastructure such as Docker containers or Linux containers (LXCs). The storage controller 108 of storage system 102, as well as other system components, may be implemented at least in part using processing devices of such processing platforms. For example, in a distributed implementation of the storage controller 108, respective distributed modules of such a storage controller can be implemented in respective containers running on respective ones of the processing devices of a processing platform.

Various aspects of one possible implementation of the snapshot group split process of FIG. 2 have been previously described with reference to snapshot tree illustrations of FIGS. 3A through 3B. These example snapshot trees will now be described in further detail.

As indicated above, FIG. 3A illustrates two snapshot trees 300-1 and 300-2 associated with respective storage volumes V1 and V2. More particularly, the two snapshot trees 300-1 and 300-2 are representations of the respective first and second snapshot groups of V1 and V2. The snapshot S1 is first snapshot originally generated from V1 that has now been identified as an appropriate candidate for removal from the first snapshot group represented by the first snapshot tree 300-1, possibly due to its data having deviated significantly from that of V1. V1 is snapped from root node R1 to generate snapshot S1. The root node R1 represents a shared node V1-S1 of the snapshot tree 300-1.

Accordingly, V1 and S1 have a shared root R1. Snapping V1 into S1 illustratively involves freezing the data in root node R1 which represents the shared V1-S1 node and creating two children V1 and S1 of R1, with S1 being the snapshot. The snapshot S2 is a snapshot of the snapshot S1, as described elsewhere herein.

The root node R2 is an example of what is referred to herein as an "empty root," and is used to facilitate copying of S2 to a new storage volume V2, illustratively by performing a "snapdiff" operation to the empty root.

The snapshot S1' represents the current version of S1 and continues to evolve over time as host writes are made to that snapshot.

A given storage volume snapshot tree 300-1 or 300-2 having a format of the type shown in FIGS. 3A and 3B represents a corresponding storage volume and its snapshots over time. When a given snapshot of the storage volume is created, two child leaf nodes are created, one representing new updates to the storage volume after creation of the snapshot, and the other representing the snapshot.

In accordance with the split process as previously described in conjunction with FIG. 2, the snapshot S1 is split from the snapshot tree 300-1 into the storage volume V2 of the snapshot tree 300-2.

It is assumed that both V1 and V2 are active storage volumes from which additional snapshots are periodically taken, eventually resulting in additional nodes V1', SV1', V1" and SV1" related to V1 and additional nodes V2', SV2', V2" and SV2" related to V2, as illustrated in the post-split arrangement of FIG. 3B. Also, the snapshots S1 and S2, and any additional snapshots generated in the manner previously described, are deleted from the first snapshot tree 300-1 after the split. This illustratively includes the particular nodes corresponding to S1, S1' and S2 in the snapshot tree 300-1 as shown in FIG. 3A.

It is to be appreciated that the snapshot tree arrangements of FIGS. 3A and 3B are presented by way of illustrative example only, and should not be construed as limiting in any way. Terms such as "snapshot tree," "root node," "branch node" and "leaf node" as used herein are intended to be broadly construed, and should not be viewed as being limited in any way to the examples of FIGS. 3A and 3B. It should therefore be understood that a wide variety of other snapshot tree arrangements may be used.

As noted above, the storage system in some embodiments comprises a content addressable storage array or other type of content addressable storage system suitably modified to incorporate snapgroup split functionality as disclosed herein.

An illustrative embodiment of such a content addressable storage system will now be described with reference to FIG. 4. In this embodiment, a content addressable storage system 405 comprises a plurality of storage devices 406 and an associated storage controller 408. The content addressable storage system 405 may be viewed as a particular implementation of the storage system 102, and accordingly is assumed to be coupled to one or more host devices of a computer system within information processing system 100.

Although it is assumed that the storage system 102 is a content addressable storage system in some embodiments, other types of storage systems can be used in other embodiments. For example, it is possible that the storage system 102 in an illustrative embodiment need not be a content addressable storage system and need not include an ability to generate snapshots and/or content-based signatures. In such an embodiment, the snapshot generator and snapshot grouping logic of the storage system can be implemented in a host device, possibly along with content-based signature generation functionality.

The storage controller 408 in the present embodiment is configured to implement snapgroup split functionality of the type described elsewhere herein. For example, the content addressable storage system 405 illustratively implements a process for splitting an active snapshot from a snapgroup, such as the process illustrated in the flow diagram of FIG. 2.

The storage controller 408 includes distributed modules 412 and 414, which are configured to operate in a manner similar to that described above for respective corresponding snapshot generator 112 and snapshot grouping logic 114 of the storage controller 108 of system 100. Module 412 is more particularly referred to as a distributed snapshot generator, and illustratively comprises multiple snapshot generator instances on respective ones of a plurality of distinct nodes, with the multiple snapshot generator instances collectively comprising the distributed snapshot generator 412. Module 414 more particularly comprises distributed snapshot grouping logic, and illustratively comprises multiple snapshot grouping logic instances on respective ones of the plurality of distinct nodes, with the multiple snapshot grouping logic instances collectively comprising the distributed snapshot grouping logic 414.

Figure 4:
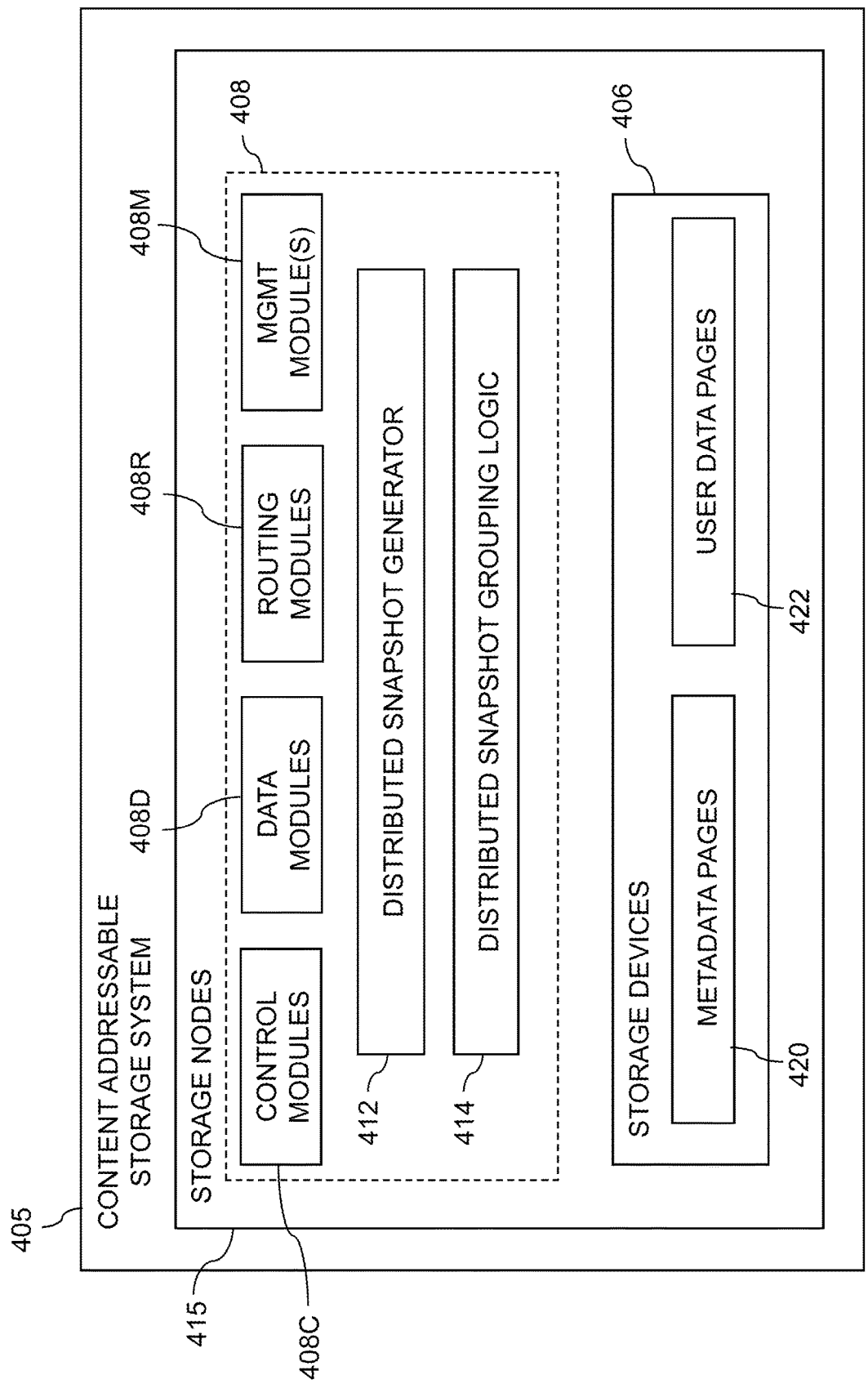
FIG. 4 illustrates a content addressable storage system comprising a distributed storage controller implementing snapgroup split functionality in an illustrative embodiment.

The content addressable storage system 405 in the FIG. 4 embodiment is implemented as at least a portion of a clustered storage system and includes a plurality of storage nodes 415 each comprising a corresponding subset of the storage devices 406. Such storage nodes 415 are examples of the "distinct nodes" referred to above, and other clustered storage system arrangements comprising multiple storage nodes and possibly additional or alternative nodes can be used in other embodiments. A given clustered storage system may therefore include not only storage nodes 415 but also additional storage nodes, compute nodes or other types of nodes coupled to network 104. Alternatively, such additional storage nodes may be part of another clustered storage system of the system 100. Each of the storage nodes 415 of the storage system 405 is assumed to be implemented using at least one processing device comprising a processor coupled to a memory.

The storage controller 408 of the content addressable storage system 405 is implemented in a distributed manner so as to comprise a plurality of distributed storage controller components implemented on respective ones of the storage nodes 415. The storage controller 408 is therefore an example of what is more generally referred to herein as a "distributed storage controller." In subsequent description herein, the storage controller 408 is referred to as distributed storage controller 408.

Each of the storage nodes 415 in this embodiment further comprises a set of processing modules configured to communicate over one or more networks with corresponding sets of processing modules on other ones of the storage nodes 415. The sets of processing modules of the storage nodes 415 collectively comprise at least a portion of the distributed storage controller 408 of the content addressable storage system 405.

The modules of the distributed storage controller 408 in the present embodiment more particularly comprise different sets of processing modules implemented on each of the storage nodes 415. The set of processing modules of each of the storage nodes 415 comprises at least a control module 408C, a data module 408D and a routing module 408R. The distributed storage controller 408 further comprises one or more management ("MGMT") modules 408M. For example, only a single one of the storage nodes 415 may include a management module 408M. It is also possible that management modules 408M may be implemented on each of at least a subset of the storage nodes 415. A given set of processing modules implemented on a particular one of the storage nodes 415 therefore illustratively includes at least one control module 408C, at least one data module 408D and at least one routing module 408R, and possibly a management module 408M.

Communication links may be established between the various processing modules of the distributed storage controller 408 using well-known communication protocols such as IP, Transmission Control Protocol (TCP), and remote direct memory access (RDMA). For example, respective sets of IP links used in data transfer and corresponding messaging could be associated with respective different ones of the routing modules 408R.

Although shown as separate modules of the distributed storage controller 408, the modules 412 and 414 in the present embodiment are assumed to be distributed at least in part over at least a subset of the other modules 408C, 408D, 408R and 408M of the storage controller 408. Accordingly, at least portions of the snapgroup split functionality provided by the modules 412 and 414 may be implemented in one or more of the other modules of the storage controller 408. In other embodiments, the modules 412 and 414 may be implemented as stand-alone modules of the storage controller 408.

The storage devices 406 are configured to store metadata pages 420 and user data pages 422, and may also store additional information not explicitly shown such as checkpoints and write journals. The metadata pages 420 and the user data pages 422 are illustratively stored in respective designated metadata and user data areas of the storage devices 406. Accordingly, metadata pages 420 and user data pages 422 may be viewed as corresponding to respective designated metadata and user data areas of the storage devices 406.

A given "page" as the term is broadly used herein should not be viewed as being limited to any particular range of fixed sizes. In some embodiments, a page size of 8 kilobytes (KB) is used, but this is by way of example only and can be varied in other embodiments. For example, page sizes of 4 KB, 16 KB or other values can be used. Accordingly, illustrative embodiments can utilize any of a wide variety of alternative paging arrangements for organizing the metadata pages 420 and the user data pages 422.

The user data pages 422 are part of a plurality of LUNs configured to store files, blocks, objects or other arrangements of data, each also generally referred to herein as a "data item," on behalf of users of the content addressable storage system 405. Each such LUN may comprise particular ones of the above-noted pages of the user data area. The user data stored in the user data pages 422 can include any type of user data that may be utilized in the system 100. The term "user data" herein is therefore also intended to be broadly construed.

A given storage volume for which content-based signatures are generated using modules 412 and 414 illustratively comprises a set of one or more LUNs, each including multiple ones of the user data pages 422 stored in storage devices 406.

The content addressable storage system 405 in the embodiment of FIG. 4 is configured to generate hash metadata providing a mapping between content-based digests of respective ones of the user data pages 422 and corresponding physical locations of those pages in the user data area.

Content-based digests generated using hash functions are also referred to herein as "hash digests." Such hash digests or other types of content-based digests are examples of what are more generally referred to herein as "content-based signatures" of the respective user data pages 422. The hash metadata generated by the content addressable storage system 405 is illustratively stored as metadata pages 420 in the metadata area. The generation and storage of the hash metadata is assumed to be performed under the control of the storage controller 408.

Each of the metadata pages 420 characterizes a plurality of the user data pages 422. For example, in a given set of n user data pages representing a portion of the user data pages 422, each of the user data pages is characterized by a LUN identifier, an offset and a content-based signature. The content-based signature is generated as a hash function of content of the corresponding user data page. Illustrative hash functions that may be used to generate the content-based signature include the above-noted SHA1 secure hashing algorithm, or other secure hashing algorithms known to those skilled in the art, including SHA2, SHA256 and many others. The content-based signature is utilized to determine the location of the corresponding user data page within the user data area of the storage devices 406.

Each of the metadata pages 420 in the present embodiment is assumed to have a signature that is not content-based. For example, the metadata page signatures may be generated using hash functions or other signature generation algorithms that do not utilize content of the metadata pages as input to the signature generation algorithm. Also, each of the metadata pages is assumed to characterize a different set of the user data pages.

A given set of metadata pages representing a portion of the metadata pages 420 in an illustrative embodiment comprises metadata pages having respective signatures. Each such metadata page characterizes a different set of n user data pages. For example, the characterizing information in each metadata page can include the LUN identifiers, offsets and content-based signatures for each of the n user data pages that are characterized by that metadata page. It is to be appreciated, however, that the user data and metadata page configurations described above are examples only, and numerous alternative user data and metadata page configurations can be used in other embodiments.

Ownership of a user data logical address space within the content addressable storage system 405 is illustratively distributed among the control modules 408C.

The snapgroup split functionality provided by modules 412 and 414 in this embodiment is assumed to be distributed across multiple distributed processing modules, including at least a subset of the processing modules 408C, 408D, 408R and 408M of the distributed storage controller 408.

For example, the management module 408M of the storage controller 408 may include a snapshot grouping logic instance that engages corresponding snapshot grouping logic instances in all of the control modules 408C and routing modules 408R in order to implement a snapgroup split process.

In some embodiments, the content addressable storage system 405 comprises an XtremIO™ storage array suitably modified to incorporate snapgroup split functionality as disclosed herein.

In arrangements of this type, the control modules 408C, data modules 408D and routing modules 408R of the distributed storage controller 408 illustratively comprise respective C-modules, D-modules and R-modules of the XtremIO™ storage array. The one or more management modules 408M of the distributed storage controller 408 in such arrangements illustratively comprise a system-wide management module ("SYM module") of the XtremIO™ storage array, although other types and arrangements of system-wide management modules can be used in other embodiments. Accordingly, snapgroup split functionality in some embodiments is implemented under the control of at least one system-wide management module of the distributed storage controller 408, utilizing the C-modules, D-modules and R-modules of the XtremIO™ storage array.

In the above-described XtremIO™ storage array example, each user data page has a fixed size such as 8 KB and its content-based signature is a 20-byte signature generated using the SHA1 secure hashing algorithm. Also, each page has a LUN identifier and an offset, and so is characterized by <lun_id, offset, signature>.

The content-based signature in the present example comprises a content-based digest of the corresponding data page. Such a content-based digest is more particularly referred to as a "hash digest" of the corresponding data page, as the content-based signature is illustratively generated by applying a hash function such as the SHA1 secure hashing algorithm to the content of that data page. The full hash digest of a given data page is given by the above-noted 20-byte signature. The hash digest may be represented by a corresponding "hash handle," which in some cases may comprise a particular portion of the hash digest. The hash handle illustratively maps on a one-to-one basis to the corresponding full hash digest within a designated cluster boundary or other specified storage resource boundary of a given storage system. In arrangements of this type, the hash handle provides a lightweight mechanism for uniquely identifying the corresponding full hash digest and its associated data page within the specified storage resource boundary. The hash digest and hash handle are both considered examples of "content-based signatures" as that term is broadly used herein.

Examples of techniques for generating and processing hash handles for respective hash digests of respective data pages are disclosed in U.S. Pat. No. 9,208,162, entitled "Generating a Short Hash Handle," and U.S. Pat. No. 9,286,003, entitled "Method and Apparatus for Creating a Short Hash Handle Highly Correlated with a Globally-Unique Hash Signature," both of which are incorporated by reference herein.

As mentioned previously, storage controller components in an XtremIO™ storage array illustratively include C-module, D-module and R-module components. For example, separate instances of such components can be associated with each of a plurality of storage nodes in a clustered storage system implementation.

The distributed storage controller in this example is configured to group consecutive pages into page groups, to arrange the page groups into slices, and to assign the slices to different ones of the C-modules. For example, if there are 1024 slices distributed evenly across the C-modules, and there are a total of 16 C-modules in a given implementation, each of the C-modules "owns" 1024/16=64 slices. In such arrangements, different ones of the slices are assigned to different ones of the control modules 408C such that control of the slices within the storage controller 408 of the storage system 405 is substantially evenly distributed over the control modules 408C of the storage controller 408.

The D-module allows a user to locate a given user data page based on its signature. Each metadata page also has a size of 8 KB and includes multiple instances of the <lun_id, offset, signature> for respective ones of a plurality of the user data pages. Such metadata pages are illustratively generated by the C-module but are accessed using the D-module based on a metadata page signature.

The metadata page signature in this embodiment is a 20-byte signature but is not based on the content of the metadata page. Instead, the metadata page signature is generated based on an 8-byte metadata page identifier that is a function of the LUN identifier and offset information of that metadata page.

If a user wants to read a user data page having a particular LUN identifier and offset, the corresponding metadata page identifier is first determined, then the metadata page signature is computed for the identified metadata page, and then the metadata page is read using the computed signature. In this embodiment, the metadata page signature is more particularly computed using a signature generation algorithm that generates the signature to include a hash of the 8-byte metadata page identifier, one or more ASCII codes for particular predetermined characters, as well as possible additional fields. The last bit of the metadata page signature may always be set to a particular logic value so as to distinguish it from the user data page signature in which the last bit may always be set to the opposite logic value.

The metadata page signature is used to retrieve the metadata page via the D-module. This metadata page will include the <lun_id, offset, signature> for the user data page if the user page exists. The signature of the user data page is then used to retrieve that user data page, also via the D-module.

Write requests processed in the content addressable storage system 405 each illustratively comprise one or more IO operations directing that at least one data item of the storage system 405 be written to in a particular manner. A given write request is illustratively received in the storage system 405 from a host device over a network. In some embodiments, a write request is received in the distributed storage controller 408 of the storage system 405, and directed from one processing module to another processing module of the distributed storage controller 408. For example, a received write request may be directed from a routing module 408R of the distributed storage controller 408 to a particular control module 408C of the distributed storage controller 408. Other arrangements for receiving and processing write requests from one or more host devices can be used.

The term "write request" as used herein is intended to be broadly construed, so as to encompass one or more IO operations directing that at least one data item of a storage system be written to in a particular manner. A given write request is illustratively received in a storage system from a host device.

In the XtremIO™ context, the C-modules, D-modules and R-modules of the storage nodes 415 communicate with one another over a high-speed internal network such as an InfiniBand network. The C-modules, D-modules and R-modules coordinate with one another to accomplish various IO processing tasks.

The write requests from the host devices identify particular data pages to be written in the storage system 405 by their corresponding logical addresses each comprising a LUN ID and an offset.

As noted above, a given one of the content-based signatures illustratively comprises a hash digest of the corresponding data page, with the hash digest being generated by applying a hash function to the content of that data page. The hash digest may be uniquely represented within a given storage resource boundary by a corresponding hash handle.

The content addressable storage system 405 utilizes a two-level mapping process to map logical block addresses to physical block addresses. The first level of mapping uses an address-to-hash ("A2H") table and the second level of mapping uses a hash metadata ("HMD") table, with the A2H and HMD tables corresponding to respective logical and physical layers of the content-based signature mapping within the content addressable storage system 405. The HMD table or a given portion thereof in some embodiments disclosed herein is more particularly referred to as a hash-to-data ("H2D") table.

The first level of mapping using the A2H table associates logical addresses of respective data pages with respective content-based signatures of those data pages. This is also referred to as logical layer mapping.

The second level of mapping using the HMD table associates respective ones of the content-based signatures with respective physical storage locations in one or more of the storage devices 406. This is also referred to as physical layer mapping.

Examples of these and other metadata structures utilized in illustrative embodiments were described elsewhere herein. These particular examples illustratively include respective A2H, H2D, HMD and PLB tables. In some embodiments, the A2H and H2D tables are utilized primarily by the control modules 408C, while the HMD and PLB tables are utilized primarily by the data modules 408D.

For a given write request, hash metadata comprising at least a subset of the above-noted tables is updated in conjunction with the processing of that write request.

The A2H, H2D, HMD and PLB tables described above are examples of what are more generally referred to herein as "mapping tables" of respective distinct types. Other types and arrangements of mapping tables or other content-based signature mapping information may be used in other embodiments.

Such mapping tables are still more generally referred to herein as "metadata structures" of the content addressable storage system 405. It should be noted that additional or alternative metadata structures can be used in other embodiments. References herein to particular tables of particular types, such as A2H, H2D, HMD and PLB tables, and their respective configurations, should be considered non-limiting and are presented by way of illustrative example only. Such metadata structures can be implemented in numerous alternative configurations with different arrangements of fields and entries in other embodiments.

The logical block addresses or LBAs of a logical layer of the storage system 405 correspond to respective physical blocks of a physical layer of the storage system 405. The user data pages of the logical layer are organized by LBA and have reference via respective content-based signatures to particular physical blocks of the physical layer.

Each of the physical blocks has an associated reference count that is maintained within the storage system 405. The reference count for a given physical block indicates the number of logical blocks that point to that same physical block.

In releasing logical address space in the storage system, a dereferencing operation is generally executed for each of the LBAs being released. More particularly, the reference count of the corresponding physical block is decremented. A reference count of zero indicates that there are no longer any logical blocks that reference the corresponding physical block, and so that physical block can be released.

It should also be understood that the particular arrangement of storage controller processing modules 408C, 408D, 408R and 408M as shown in the FIG. 4 embodiment is presented by way of example only. Numerous alternative arrangements of processing modules of a distributed storage controller may be used to implement snapgroup split functionality in a clustered storage system in other embodiments.

Additional examples of content addressable storage functionality implemented in some embodiments by control modules 408C, data modules 408D, routing modules 408R and management module(s) 408M of distributed storage controller 408 can be found in U.S. Pat. No. 9,104,326, entitled "Scalable Block Data Storage Using Content Addressing," which is incorporated by reference herein. Alternative arrangements of these and other storage node processing modules of a distributed storage controller in a content addressable storage system can be used in other embodiments.

Illustrative embodiments of a storage system with snapgroup split functionality as disclosed herein can provide a number of significant advantages relative to conventional arrangements.

For example, in some embodiments, techniques are provided for splitting a snapshot from a snapgroup in a manner that advantageously ensures consistency in the case of an active snapshot. Such embodiments can therefore be configured to accurately and effectively split an actively written snapshot from one snapshot group into a separate storage volume of another snapshot group, while maintaining consistency for both the actively written snapshot and the separate storage volume. Numerous other split scenarios are possibly using the disclosed techniques.

Additionally or alternatively, such embodiments can be used to improve system performance in situations in which one or more snapshot groups have grown to exceed a desired maximum snapgroup size, or in which one or more snapshots of at least one snapshot group have become corrupted.

For example, in cases involving corruption of one or more snapshots of a snapshot group, a good remaining snapshot of that snapshot group can be selected and split off into a new snapshot group using the techniques disclosed herein. The previous snapshot group containing the corrupted snapshots can then be deleted.

Snapgroup split functionality as disclosed herein can be implemented in at least one storage system, in at least one host device, or partially in one or more storage systems and partially in one or more host devices.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement host devices and storage systems with snapgroup split functionality will now be described in greater detail with reference to FIGS. 5 and 6. Although described in the context of system 100, these platforms may also be used to implement at least portions of other information processing systems in other embodiments.

Figure 5:
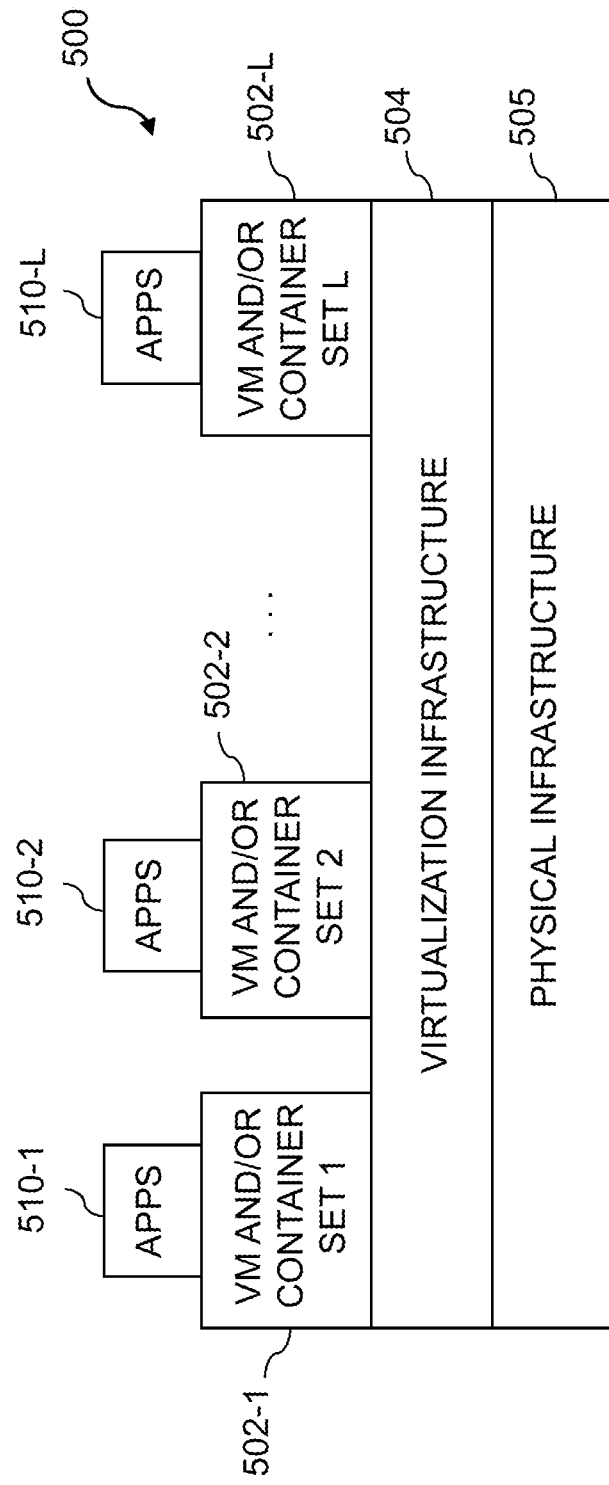
FIGS. 5 and 6 show examples of processing platforms that may be utilized to implement at least a portion of an information processing system in illustrative embodiments.
Figure 6:
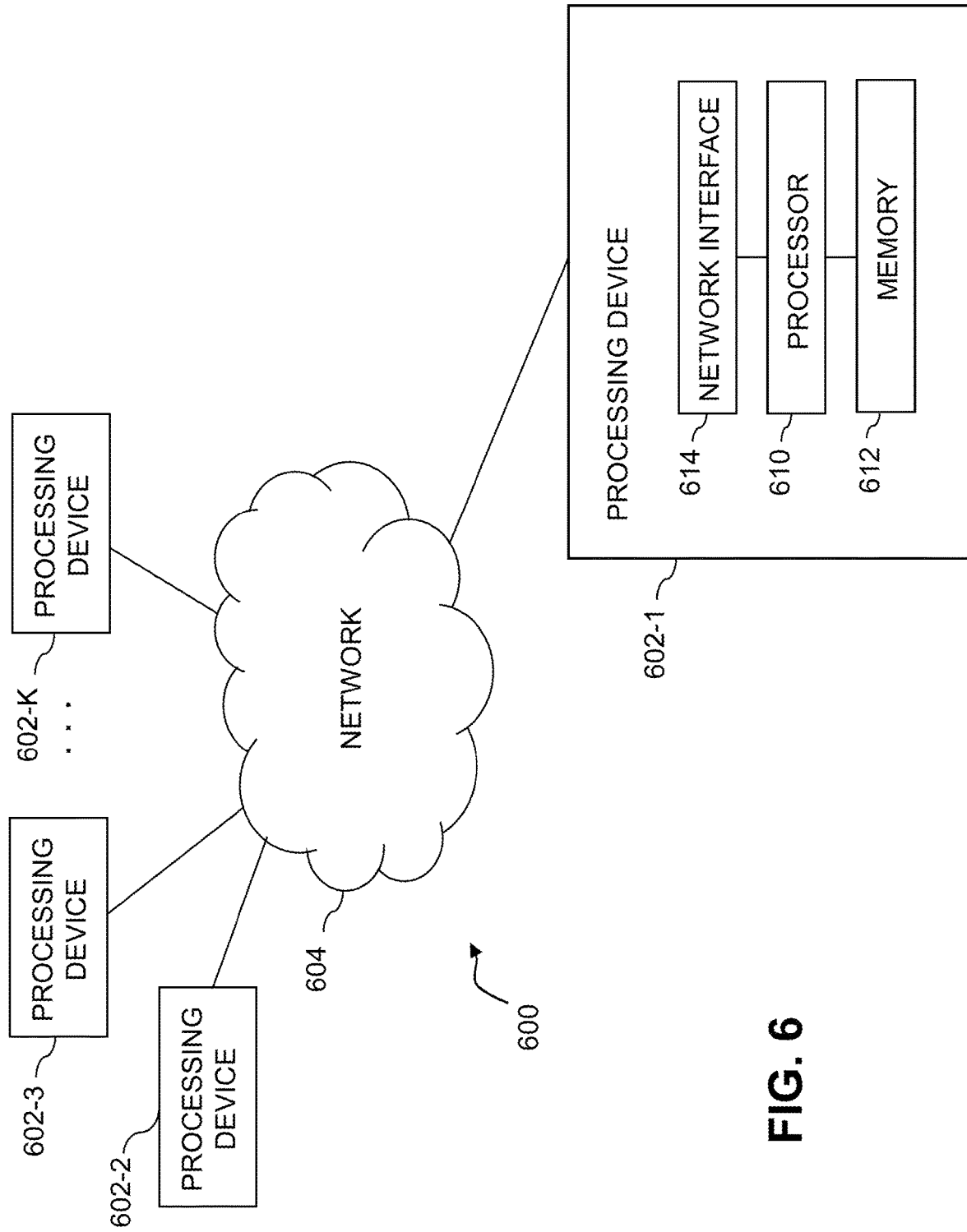

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. Such implementations can provide snapgroup split functionality of the type described above for one or more processes running on a given one of the VMs. For example, each of the VMs can implement snapshot grouping logic instances and/or other components for supporting snapgroup split functionality in the system 100.

An example of a hypervisor platform that may be used to implement a hypervisor within the virtualization infrastructure 504 is the VMware® vSphere® which may have an associated virtual infrastructure management system such as the VMware® vCenter™. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system. Such implementations can also provide snapgroup split functionality of the type described above. For example, a container host device supporting multiple containers of one or more container sets can implement one or more instances of snapshot grouping logic and/or other components for supporting snapgroup split functionality in the system 100.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA), graphics processing unit (GPU) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the snapgroup split functionality of one or more components of a storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage nodes, storage devices, storage controllers, snapshot generators, snapshot grouping logic and other components. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device comprising a processor coupled to a memory;
said at least one processing device being configured:
to identify a first snapshot to be split from a first snapshot group;
to generate a second snapshot of the first snapshot;
to continue write operations to the first snapshot;
to copy the second snapshot to a storage volume of a second snapshot group;
to compute a differential between the first and second snapshots;
responsive to the differential between the first and second snapshots being above a specified threshold, generating an additional snapshot of the first snapshot, computing a differential between the additional snapshot and a previous snapshot of the first snapshot, and if necessary repeating the generating of an additional snapshot and the computing of a differential between the additional snapshot and a previous snapshot one or more additional times, until the differential is at or below the specified threshold; and
to update the storage volume of the second snapshot group based at least in part on one or more of the computed differentials.

2. The apparatus of claim 1 wherein said at least one processing device comprises a storage controller of the storage system.

3. The apparatus of claim 2 wherein the storage system comprises a plurality of storage nodes each comprising a set of processing modules configured to communicate with corresponding sets of processing modules on other ones of the storage nodes, the sets of processing modules of the storage nodes of the source storage system collectively comprising at least a portion of the storage controller of the storage system.

4. The apparatus of claim 1 wherein the first snapshot group is in the form of a first snapshot tree having a first root node.

5. The apparatus of claim 4 wherein the storage volume is part of a second snapshot group in the form of a second snapshot tree having a second root node different than the first root node.

6. The apparatus of claim 1 wherein copying the second snapshot to a storage volume of a second snapshot group comprises:
generating a differential between the second snapshot and an empty root node; and
constructing the storage volume of the second snapshot group based at least in part on the differential between the second snapshot and the empty root node.

7. The apparatus of claim 1 wherein computing a given one of the differentials comprises computing the given differential based in part on a comparison of content-based signatures of respective data pages between the corresponding snapshots.

8. The apparatus of claim 7 wherein the content-based signatures comprise hash handles of the respective data pages.

9. The apparatus of claim 7 wherein the content-based signatures comprise hash digests of the respective data pages.

10. The apparatus of claim 1 wherein the threshold is determined based at least in part on an amount of time required to process a computed differential of a particular size.

11. The apparatus of claim 1 wherein updating the storage volume of the second snapshot group based at least in part on one or more of the computed differentials comprises updating the storage volume of the second snapshot group in respective ones of a plurality of iterations using respective different ones of the computed differentials.

12. The apparatus of claim 1 wherein updating the storage volume of the second snapshot group based at least in part on one or more of the computed differentials comprises:
updating the storage volume of the second snapshot group using a particular one of the computed differentials;
maintaining a pivot address indicator denoting a particular logical address of the first snapshot to which the updating has progressed; and
replicating to the storage volume each of one or more additional received write operations directed to logical addresses of the first snapshot that are previous to the particular logical address denoted by a corresponding current value of the pivot address indicator.

13. The apparatus of claim 1 wherein the processing device is further configured, responsive to the pivot address indicator reaching a final logical address of the first snapshot, to complete the split of the first snapshot from the first snapshot group into the storage volume of the second snapshot group such that all subsequent writes directed to the first snapshot are instead sent to the storage volume.

14. The apparatus of claim 1 wherein the processing device is further configured to delete the first snapshot, the second snapshot and any additional snapshots of the first snapshot from the first snapshot group responsive to completion of the split of the first snapshot from the first snapshot group into the storage volume of the second snapshot group.

15. A method comprising:
identifying a first snapshot to be split from a first snapshot group;
generating a second snapshot of the first snapshot;
continuing write operations to the first snapshot;
copying the second snapshot to a storage volume of a second snapshot group;
computing a differential between the first and second snapshots;
responsive to the differential between the first and second snapshots being above a specified threshold, generating an additional snapshot of the first snapshot, computing a differential between the additional snapshot and a previous snapshot of the first snapshot, and if necessary repeating the generating of an additional snapshot and the computing of a differential between the additional snapshot and a previous snapshot one or more additional times, until the differential is at or below the specified threshold; and
updating the storage volume of the second snapshot group based at least in part on one or more of the computed differentials;
wherein the method is implemented by at least one processing device comprising a processor coupled to a memory.

16. The method of claim 15 wherein updating the storage volume of the second snapshot group based at least in part on one or more of the computed differentials comprises updating the storage volume of the second snapshot group in respective ones of a plurality of iterations using respective different ones of the computed differentials.

17. The method of claim 15 wherein updating the storage volume of the second snapshot group based at least in part on one or more of the computed differentials comprises:

updating the storage volume of the second snapshot group using a particular one of the computed differentials;

maintaining a pivot address indicator denoting a particular logical address of the first snapshot to which the updating has progressed; and replicating to the storage volume each of one or more additional received write operations directed to logical addresses of the first snapshot that are previous to the particular logical address denoted by a corresponding current value of the pivot address indicator.

18. A computer program product comprising a non-transitory processor-readable storage medium having stored therein program code of one or more software programs, wherein the program code when executed by at least one processing device causes said at least one processing device:

to identify a first snapshot to be split from a first snapshot group;

to generate a second snapshot of the first snapshot;

to continue write operations to the first snapshot;

to copy the second snapshot to a storage volume of a second snapshot group;

to compute a differential between the first and second snapshots;

responsive to the differential between the first and second snapshots being above a specified threshold, generating an additional snapshot of the first snapshot, computing a differential between the additional snapshot and a previous snapshot of the first snapshot, and if necessary repeating the generating of an additional snapshot and the computing of a differential between the additional snapshot and a previous snapshot one or more additional times, until the differential is at or below the specified threshold; and to update the storage volume of the second snapshot group based at least in part on one or more of the computed differentials.

19. The computer program product of claim 18 wherein updating the storage volume of the second snapshot group based at least in part on one or more of the computed differentials comprises updating the storage volume of the second snapshot group in respective ones of a plurality of iterations using respective different ones of the computed differentials.

20. The computer program product of claim 18 wherein updating the storage volume of the second snapshot group based at least in part on one or more of the computed differentials comprises:

updating the storage volume of the second snapshot group using a particular one of the computed differentials;

maintaining a pivot address indicator denoting a particular logical address of the first snapshot to which the updating has progressed; and replicating to the storage volume each of one or more additional received write operations directed to logical addresses of the first snapshot that are previous to the particular logical address denoted by a corresponding current value of the pivot address indicator.

* * * * *